US009298661B2

(12) United States Patent  
Hamel et al.

(10) Patent No.: US 9,298,661 B2  
(45) Date of Patent: Mar. 29, 2016

(54) DOCKING ASSEMBLY WITH A RECIPROCALLY MOVABLE HANDLE FOR DOCKING A HANDHELD DEVICE

(71) Applicant: Technologies Humanware Inc., Longueuil (Quebec) (CA)

(72) Inventors: Pierre Hamel, Verdun (CA); Martin Julien, Brossard (CA); Georges Bourque, Montreal (CA); Carle Auclair, La Prairie (CA); Luc Blanchette, Montreal (CA)

(73) Assignee: TECHNOLOGIES HUMANWARE INC., Quebec (CA)

( * ) Notice: Subject to any disclaimer, the term of this patent is extended or adjusted under 35 U.S.C. 154(b) by 635 days.

(21) Appl. No.: 13/724,816

(22) Filed: Dec. 21, 2012

(65) Prior Publication Data

US 2014/0181347 A1 Jun. 26, 2014

(51) Int. Cl.
| | |
|---|---|
| G06F 13/40 | (2006.01) |
| G06F 1/16 | (2006.01) |
| H04M 1/02 | (2006.01) |
| H04M 1/04 | (2006.01) |
| H04M 1/725 | (2006.01) |

(52) U.S. Cl.  
CPC .......... G06F 13/4081 (2013.01); G06F 1/1632 (2013.01); H04M 1/0274 (2013.01); H04M 1/04 (2013.01); H04M 1/72594 (2013.01)

(58) Field of Classification Search  
USPC .......... 710/300–306; 439/208, 211, 253, 810, 439/841, 93; 200/51.14, 50.15, 50.16  
See application file for complete search history.

(56) References Cited

U.S. PATENT DOCUMENTS

| | | | |
|---|---|---|---|
| 5,790,375 | A | 8/1998 | Lee |
| 5,831,667 | A | 11/1998 | Siminou |
| 5,862,036 | A | 1/1999 | Lin |
| 6,033,224 | A | 3/2000 | Kurzweil et al. |
| 6,045,238 | A | 4/2000 | Wheeler et al. |
| 6,657,654 | B2 * | 12/2003 | Narayanaswami ........ 348/14.04 |
| D624,107 | S | 9/2010 | Goldenberg |
| 7,895,384 | B2 * | 2/2011 | Matsui .......................... 710/300 |
| 8,077,453 | B2 * | 12/2011 | Swan et al. .............. 361/679.41 |

(Continued)

FOREIGN PATENT DOCUMENTS

| | | |
|---|---|---|
| GB | 2428530 | 1/2007 |
| GB | 2471145 | 12/2010 |

(Continued)

*Primary Examiner* — Raymond Phan  
(74) *Attorney, Agent, or Firm* — Hovey Williams LLP

(57) ABSTRACT

A docking assembly for docking a handheld device thereto is provided. The docking assembly includes a cradle for receiving the handheld device, and a handle adjacent to the cradle and reciprocally movable inwardly and outwardly relative to the cradle between an open and a position. The handle has a handle interface facing a corresponding device interface of the handheld device when the handheld device is placed in the cradle. The handle interface has a pair of alignment projections and a handle data connector connectable to a device data connector of the handheld device, the alignment projections being engageable with complimentary alignment cavities of the handheld device. The docking assembly further includes a displacement mechanism configured such that, as the handle moves toward the closed position, the alignment projections progressively engage the alignment cavities and guide the handle and device data connectors toward each other for connection therebetween.

23 Claims, 9 Drawing Sheets

(56) References Cited

U.S. PATENT DOCUMENTS

| | | |
|---|---|---|
| 8,265,319 B2 * | 9/2012 | Groset et al. ............ 381/334 |
| 2005/0062847 A1 | 3/2005 | Johnston |
| 2007/0292026 A1 | 12/2007 | Reznik et al. |
| 2008/0231950 A1 | 9/2008 | Lvovsky et al. |
| 2009/0048842 A1 | 2/2009 | Albrecht et al. |
| 2009/0180660 A1 * | 7/2009 | Groset et al. ............ 381/386 |
| 2009/0237660 A1 | 9/2009 | Albrecht et al. |
| 2010/0329555 A1 | 12/2010 | Chapman et al. |
| 2010/0331043 A1 | 12/2010 | Chapman et al. |
| 2011/0066424 A1 | 3/2011 | Albrecht et al. |
| 2011/0141256 A1 | 6/2011 | Rodriguez et al. |
| 2011/0164061 A1 | 7/2011 | Weiss et al. |
| 2011/0182471 A1 | 7/2011 | Reznik et al. |
| 2012/0029920 A1 | 2/2012 | Albrecht et al. |
| 2012/0151022 A1 * | 6/2012 | Ayyagari et al. ............ 709/222 |

FOREIGN PATENT DOCUMENTS

| | | |
|---|---|---|
| KR | 20070089290 | 8/2007 |
| WO | 9924969 | 5/1999 |
| WO | 0036839 | 6/2000 |
| WO | 2005096760 | 10/2005 |
| WO | 2007095236 | 8/2007 |
| WO | 2007109337 | 9/2007 |
| WO | 2008063597 | 5/2008 |
| WO | 2008116140 | 9/2008 |
| WO | 2009006015 | 1/2009 |
| WO | 2009154451 | 12/2009 |
| WO | 2010017121 | 2/2010 |
| WO | 2010025359 | 3/2010 |
| WO | 2010033914 | 3/2010 |
| WO | 2011159898 | 12/2011 |

* cited by examiner

DOCKING ASSEMBLY WITH A RECIPROCALLY MOVABLE HANDLE FOR DOCKING A HANDHELD DEVICE

FIELD OF THE INVENTION

The present invention generally relates to the field of docking assemblies for handheld devices, and more particularly concerns a docking assembly that facilitates docking and undocking of a handheld device thereto, especially for use by low-vision individuals.

BACKGROUND

Loss of visual acuity is a growing concern worldwide. The World Health Organization currently estimates to 2.5% the incidence of low vision in industrialized countries and this figure is expected to continue increasing with ageing population. Low vision may be generally referred to as a condition where ordinary eye glasses, lens implants or contact lenses are not sufficient for providing sharp sight. The largest growing segment of the low-vision population in developed countries is expected to be people aged 65 years old and older, which most notably due to age-related eye diseases such as macular degeneration, glaucoma and diabetic retinopathy, cataract, detached retina, and retinitis pigmentosa. Some people are also born with low vision.

Low-vision individuals often find it difficult, if not impossible, to read small writing or to discern small objects without high levels of magnification. This limits their ability to lead an independent life because reading glasses and magnifying glass typically cannot provide sufficient magnification for them. In order to assist low-vision individuals in performing daily tasks, various magnification devices and systems are known in the art, including handheld devices that can be used as video magnifiers.

In many instances, it may be desirable for a user to be able to connect or dock a handheld device to a cable or docking assembly, such as for transferring data between the handheld device and an external device or for supplying power to the docked handheld device.

In this regard, various docking mechanisms are known in the art that can be used to dock a handheld device to a docking assembly. Convenience of docking and undocking of the handheld device should generally be a key feature of docking mechanisms. However, docking mechanisms involving numerous, small or fragile connecting parts, such as forty-pin connectors, are typically not adapted for use by low-vision individuals since these connecting parts require to be precisely and meticulously aligned with respect to one another for properly docking the handheld device. As a result, properly and securely docking a handheld device using existing docking mechanisms can prove to be a challenging task for users suffering from low-vision.

In view of the above considerations, there is therefore a need for a docking assembly for a handheld device that can be used more easily and conveniently by low-vision individuals, while also alleviating at least some of the drawbacks of the prior art.

SUMMARY

In accordance with one aspect of the invention, there is provided a docking assembly for removably docking a handheld device thereto. The handheld device has a device interface including a pair of spaced-apart first alignment cavities and a device data connector. The docking assembly includes:

- a cradle adapted to receive the handheld device therein;
- a first handle adjacent to the cradle and reciprocally movable inwardly and outwardly relative to the cradle between an open position and a closed position of the first handle, the first handle having a handle interface that faces the device interface when the handheld device is placed in the cradle, the handle interface including a pair of spaced-apart first alignment projections and a handle data connector connectable to the device data connector, the first alignment projections being engageable with the first alignment cavities of the handheld device; and
- a displacement mechanism operatively connected to the first handle and configured for allowing the first handle to reciprocally move between the open and closed positions thereof such that, as the first handle is moved inwardly from the open position to the closed position thereof, the first alignment projections progressively engage the first alignment cavities in order to guide the handle data connector toward the device data connector until a connection therebetween is established.

Preferably, the docking assembly may include a biasing element biasing the first handle in the open position thereof by applying thereto an outwardly directed restoring force. The docking assembly also preferably includes a securing element for maintaining the first handle in the closed position thereof. In such an embodiment, the securing element, which may be embodied by magnetically-attractive components, is configured to apply an inwardly directed force to the first handle sufficient to counteract the outwardly directed restoring force produced by the biasing element.

In some embodiments, the docking assembly preferably includes a second handle adjacent to the cradle and opposing the first handle, the second handle being reciprocally movable inwardly and outwardly relative to the cradle between an open position and a closed position of the second handle. Further preferably, in some of these embodiments, the displacement mechanism operatively connects the first and second handles, so that the first and second handles are together reciprocally movable inwardly and outwardly relative to the cradle between an open position and a closed position of the first and second handles.

Other features and advantages of the present invention will be better understood upon reading of preferred embodiments thereof with reference to the appended drawings.

BRIEF DESCRIPTION OF THE DRAWINGS

In FIG. 2A, the first and second handles of the docking assembly are in the open position thereof so that the handheld device is undocked from the docking assembly. In FIG. 2B, the first and second handles of the docking assembly are in an intermediate position between the open and closed positions thereof. In FIG. 2C, the first and second handles of the docking assembly are in the closed position thereof so that the handheld device is docked to the docking assembly.

DESCRIPTION OF PREFERRED EMBODIMENTS

Figure 1A:
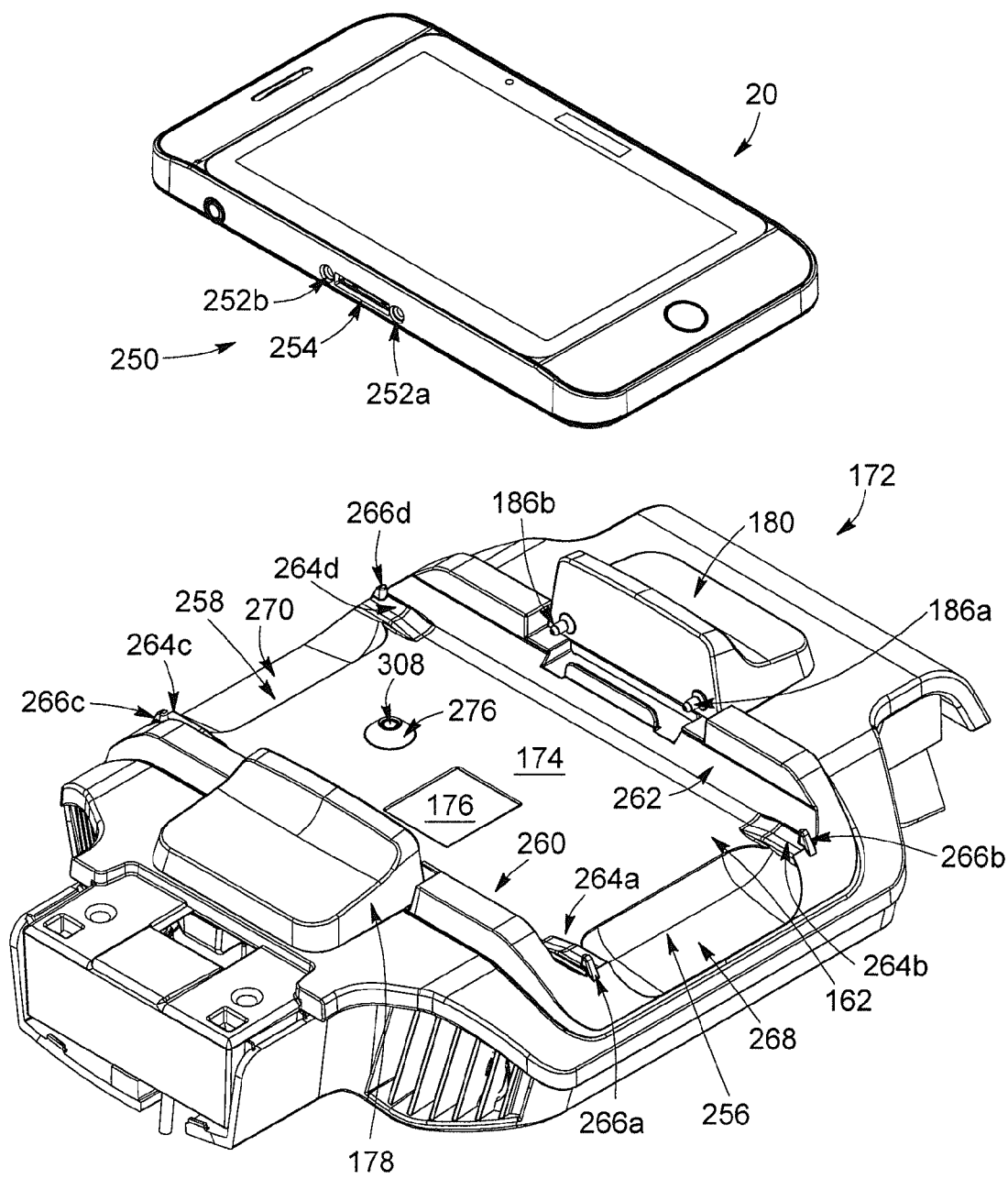
FIGS. 1A and 1B are opposite perspective views of a docking assembly for removably docking a handheld device thereto, in accordance with an embodiment of the invention

In accordance with one aspect of the invention, there is provided a docking assembly for removably docking a handheld device thereto.

As will be described in further detail below, the docking assembly of the present invention generally includes three main components: a cradle adapted to receive the handheld device therein, a handle reciprocally movable inwardly and outwardly relative to the cradle between an open position and a closed position, and a displacement mechanism for allowing the handle to move between the open and closed positions thereof. The handle has a pair of alignment projections engageable with complimentary alignment cavities of the handheld device, and a handle data connector connectable to a corresponding device data connector of the handheld device. The displacement mechanism is configured such that, as the handle moves inwardly toward the closed position, the alignment projections progressively engage the alignment cavities and guide the handle and device data connectors toward each other for connection therebetween, thus enabling docking of the handheld device to the docking assembly. Each of these three main components of the docking assembly will be described in further detail below, with reference to preferred embodiments thereof.

Embodiments of the present invention may be particularly useful in any application where it is necessary to provide individuals with a straightforward, intuitive, and effortless mechanism for connecting a handheld device to a docking assembly. In one embodiment such a docking assembly may be used to connect a handheld magnification device for low vision users or the like to a "desktop-type" base station where the handheld device is to be maintained at an operative position above a object to the magnified. However, one of ordinary skill in the art will understand that the docking assembly in accordance with embodiments of the invention may also be useful to any individual whose manual dexterity or fine motor skills may be limited, for example elderly or handicapped people, as well as to any person desiring or requiring a convenient docking mechanism.

As used throughout the present description, the term "docking assembly" is understood to refer to an assembly that both holds or mechanically supports a handheld device and provides a unidirectional or bidirectional communication and data-transfer interface for the handheld device when the handheld device is docked thereto. Hence, the term "docking" as used herein means that the handheld device may be received by and connected to the docking assembly in a manner suitable for power delivery, audio, video, and data transfer to be established therebetween. Furthermore, the term "removably docking" refers to being able to readily and repeatedly dock and undock the handheld device to and from the docking assembly.

Embodiments of the docking assembly may serve as an interface for providing convenient connections for transferring data between a docked handheld device and one or more of a wide variety of external devices connected to the docking assembly. These devices may typically be stationary or fixed, and may include, without being limited to, a desktop computer, a laptop computer, a display, a television, a storage device, a printer, a speaker, and the like. The docking assembly may alternatively or additionally be used to supply power to the docked handheld device. For example, the power supplied by the docking assembly may be used to recharge a rechargeable battery of the handheld device, or may alternatively or additionally provide operational power to the handheld device while the handheld device is docked to the docking assembly.

For example, in some embodiments, the docking assembly may be mounted on a base station including a frame structure and monitor, and be configured to communicatively couple or interface a handheld magnification device for low-vision individuals to the base station. One such system is described in co-pending and co-assigned patent application entitled "Magnification system", filed concurrently with the present application, the contents of which are incorporated herein by reference in their entirety. In such embodiments, the handheld device may include a camera module and a processing unit and be mounted on the base station via the docking assembly, such that images of documents or other objects disposed on a workspace of the frame structure may be acquired by the camera module of the handheld device and displayed on the monitor provided with the base station.

Throughout the present description, the term "handheld" is understood to refer to a device that is both small and light enough to be readily held in and operated by one or both hands of a user. Furthermore, the handheld device should be portable, so that it may be easily carried in a pocket, a purse or the like. It will be understood by one of ordinary skill in the art that any suitable handheld device may be docked to the docking assembly according to embodiments of the invention, which may include, without being limited to, mobile electronic devices such cell phones, smartphones, tablet computers, e-book readers, handheld magnification devices, digital cameras, storage devices, personal digital assistants, handheld video game consoles, and portable media players. Hereinafter, a handheld magnification device for low-vision individuals, such as described in co-pending and co-assigned patent application entitled "Handheld magnification device with a two-camera module", filed concurrently with the present application, the contents of which are incorporated herein by reference in their entirety, will be taken as an example for the handheld device.

Figure 1B:
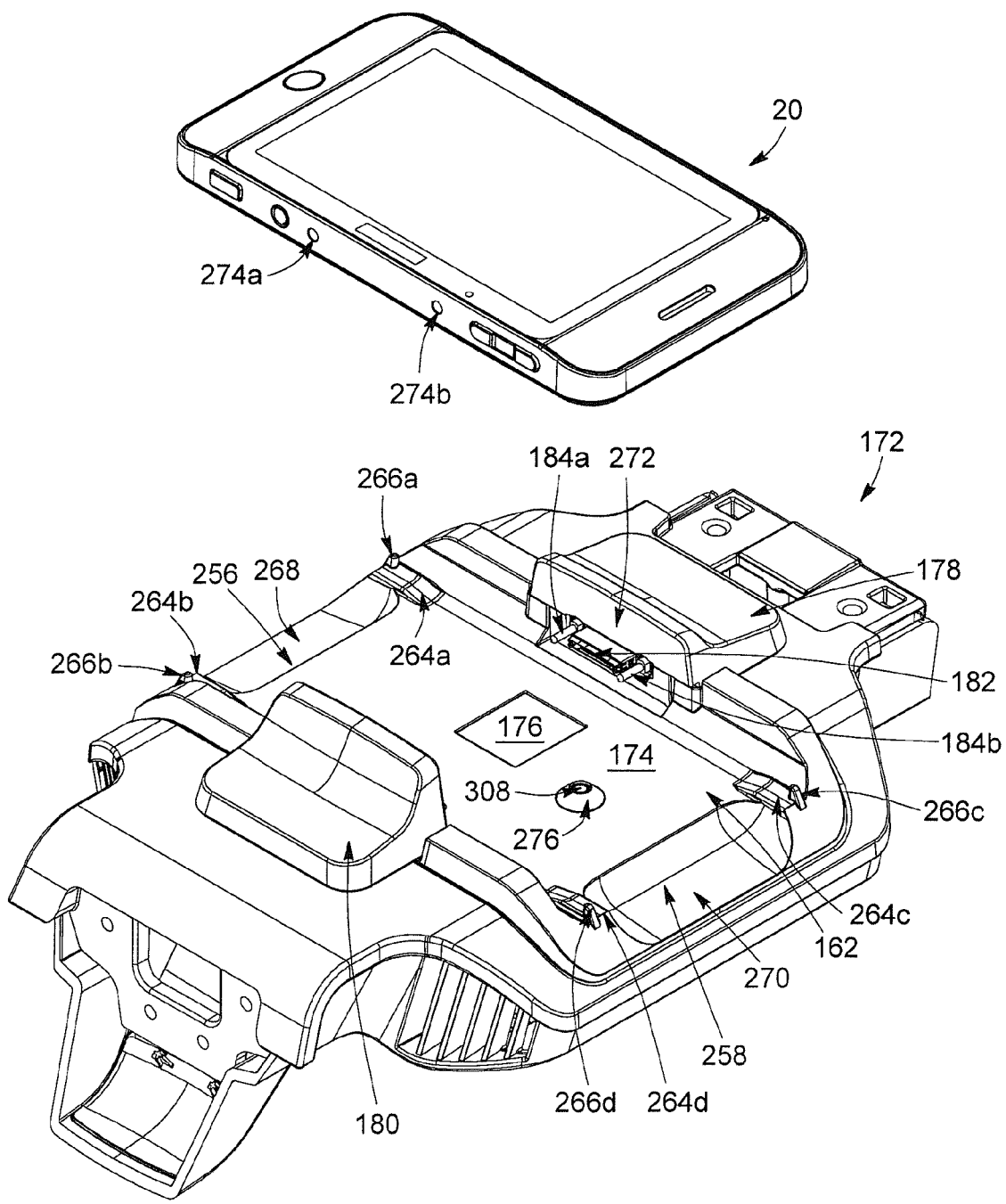

Referring more specifically to FIGS. 1A and 1B, there are shown opposite perspective views of a docking assembly 172 for removably docking a handheld device 20 thereto, in accordance with an embodiment of the invention.

The handheld device 20 is generally provided with a device interface 250 including a pair of spaced-apart first alignment cavities 252a and 252b and a device data connector 254. In the illustrated embodiment, the device data connector 254 is located between the two first alignment cavities 252a and 252b. However, in other embodiments, the relative disposition of the device data connector 254 and the pair of first alignment cavities 252a and 252b may be different without departing from the scope of the invention. As will be described in further detail below, the device data connector 254 allows the handheld device 20 to be docked to the docking assembly 172 and to exchange data therewith. Preferably, the device data connector 254 includes at least one electrical input/output (I/O) contacts, ports, terminals or connectors for establishing audio, video, power and data connections with electronics connected to the docking assembly 172, for example for sending a video stream from the handheld device 20 to an external monitor connected to the docking assembly 172. As will also be discussed hereinbelow, the two alignment cavities 252a and 252b provide alignment aids for facilitating docking of the handheld device 20 to the docking assembly 172. The alignment cavities 252a and 252b may be embodied by structures of various shapes and sizes such as grooves, depressions, holes, nooks, indentations, recesses, slots, slits, openings, apertures, and the like.

Cradle

The docking assembly 172 of FIGS. 1A and 1B first includes, a cradle 162 adapted to receive the handheld device 20 therein. As used herein, the term "cradle" is understood to refer broadly to any receiving receptacle capable of housing or supporting the handheld device 20. One of ordinary skill in the art will understand that this terminology is not intended to be limiting. The material making up the exterior of cradle is preferably made of a rigid material of sufficient sturdiness (e.g. molded or machined plastics, aluminum or stamped steel) to support the handheld device and to resist frequent interactions with a user.

Figure 2A:
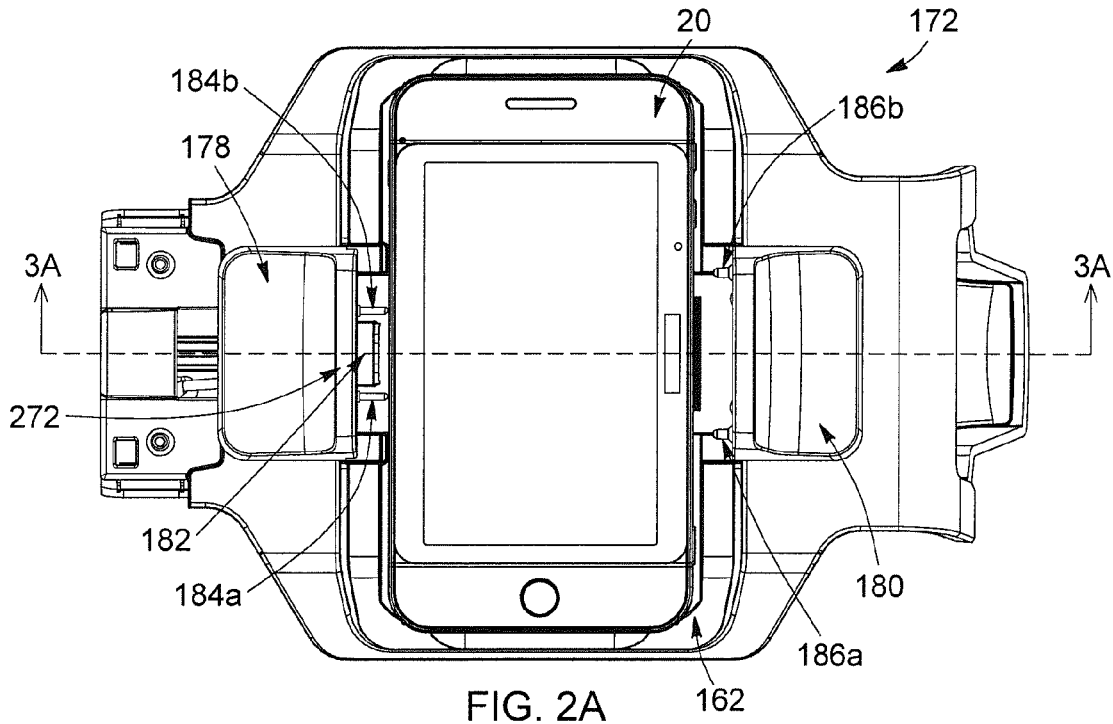
FIGS. 2A to 2C are top views of the docking assembly of FIGS. 1A and 1B, wherein the handheld device is received in the cradle of the docking assembly.
Figure 2B:
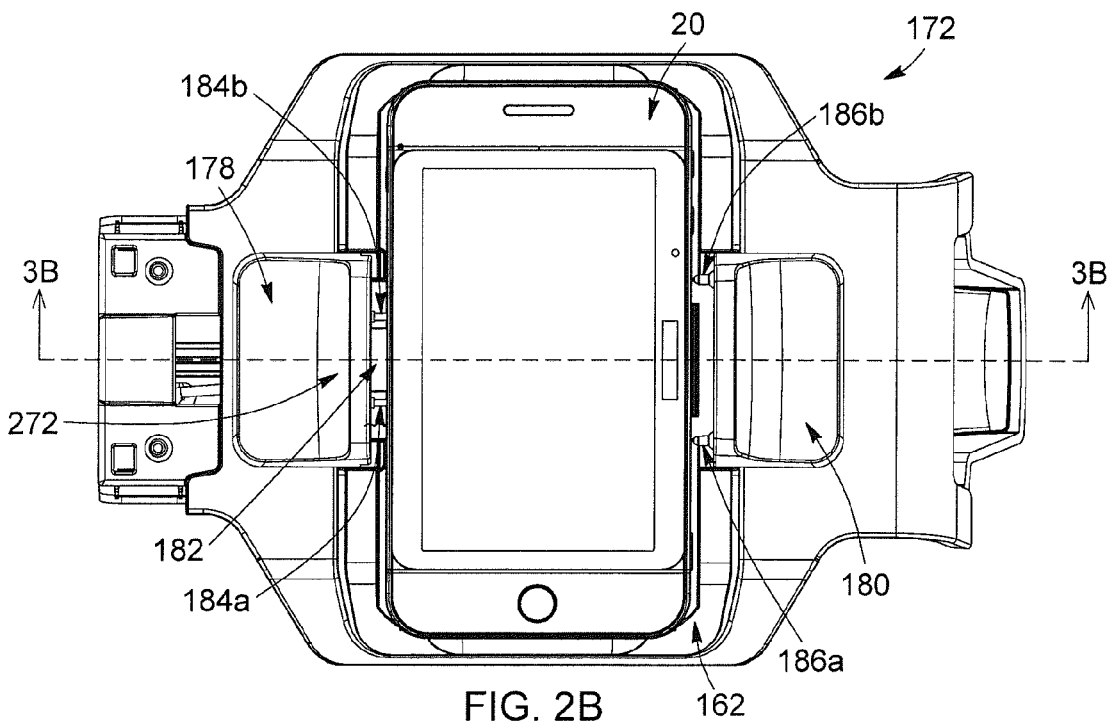
Figure 2C:
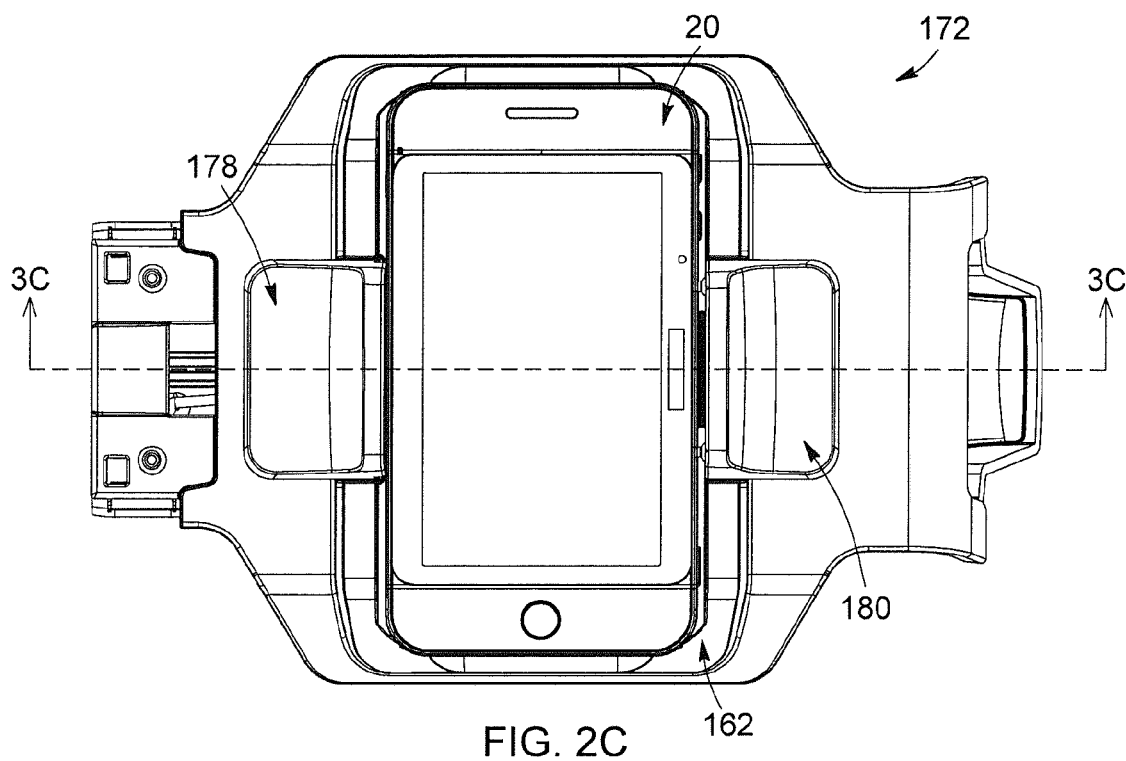

The cradle 162 preferably has a shape that substantially matches a shape of the handheld device 20 for receiving the handheld device 20 snugly in the cradle 162, as shown in FIGS. 2A to 2C, wherein the handheld device 20 is received in the cradle 162 in a completely undocked state (FIG. 2A), partially undocked state (FIG. 2B), and docked state (FIG. 2C). As used herein, the term "snugly" is understood to mean that the handheld device 20 is received in the cradle 162 so as to fit closely against at least a portion of the cradle 162. In other words, the cradle 162 is configured for a mating relationship with the handheld device 20 so as to steadily position the handheld device 20 with respect to the cradle 162. For example, in the embodiments of FIGS. 1A, 1B, 2A to 2C, the cradle 162 has a rectangular shape with rounded corners in accordance with the rectangular prismatic shape of the handheld device 20. However, it will be understood that, in other embodiments and depending on the overall shape of the handheld device 20 to be docked to the docking assembly 172, the cradle 162 may assume a variety of shapes other than rectangular including, but not limited to, circular, semi-circular, square, elliptical, oval, or trapezoidal without departing from the scope of the invention.

In the embodiment of FIGS. 1A and 1B, the cradle 162 preferably includes a bottom wall 174 shaped and configured to receive and support the handheld device 20, a first side wall 260, and a second side wall 262 opposite to the first side wall 260, and optionally, a first side portion 256, a second side portion 258 opposite to the first side portion. As mentioned above and as better illustrated in FIGS. 2A to 2C, it will be understood that the first and second side portions 256 and 258 and the first and second side walls 260 and 262 of the cradle 162 are generally perpendicular to one another and are preferably shaped and configured so that the handheld device 20 is received snugly in the cradle 162. More particularly, the first and second side walls 260 and 262 are also preferably configured for maintaining the handheld device in place therebetween so as to prevent inward and outward movements of the handheld device when the handheld device is received in the cradle, that is, for preventing movement of the handheld device along a direction perpendicular to the first and second side walls 260 and 262. Moreover, throughout the present description, the terms "inward" and "outward" refer respectively to a direction toward and away from a center of the cradle, wherein the direction is taken as the direction of reciprocating movement of the handle of the docking assembly, which will be considered in greater detail hereinbelow.

Referring back to FIGS. 1A and 1B, in some embodiments, the bottom wall 174 may include a transparent window 176 for allowing the handheld device 20 to acquire images therethrough. The transparent window 176 may be embodied by a sheet made of a transparent material such glass or plastic, or simply by a hole or aperture bored through the bottom wall 174 of the cradle 162. It will be understood by one of ordinary skill in the art that the provision of a transparent window 176 may be especially useful if the handheld device 20 includes a camera module, which would typically be the case when the handheld device is embodied by a handheld magnification device for low-vision individuals. In such embodiments, the camera module of the handheld device 20 is preferably aligned with the transparent window 176 when the handheld device 20 is received in the cradle 162. The docking assembly 172 may further be disposed above a workspace so that images of documents or other objects disposed on the workspace may be acquired by the camera module of the handheld device through the transparent window 176 provided in the bottom wall 174.

Generally speaking, the cradle 162 may preferably be provided one or more components, features, or devices facilitating the insertion and removal of the handheld device 20 in the cradle 162, or securing the handheld device 20 in place once it is received in the cradle 160. For example, in some embodiments, the cradle 172 may further include support elements 264a to 264d for receiving the handheld device 20 thereonto, each support element 264a to 264d projecting upwardly from the bottom wall 174 near a corner thereof. It will be understood by one of ordinary skill in the art that, in these embodiments, the support elements 264a to 264d may advantageously minimize the contact surface between the cradle 162 and the handheld device 20 resting thereonto. In turn, this reduced contact surface area help mitigating the risk of damaging the surface of the handheld device 20 that is parallel with the bottom wall 174 of the cradle 162 when the handheld device 20 is received therein, and facilitating grasping of the handheld device 20 with a user's hand while removing the handheld device 20 from the cradle 162. However, it will also be understood by one of ordinary skill in the art that, in other embodiments, various numbers, shape, and configurations of support elements could be envisioned without departing from the scope of the present invention.

It will further be understood that, broadly speaking, the cradle 162 is preferably configured so as to prevent or minimize movement of the handheld device 20 in a plane parallel to the bottom wall 172 when the handheld device 20 is received in the cradle 162. As mentioned above, inward and outward movements of the handheld device 20 may be prevented by providing the cradle 162 with side walls 260 and 262, as exemplified in the embodiment depicted in FIGS. 1A and 1B. In some embodiments, each of the four support elements 264a to 264d may further be provided with a stopper 266a to 266d for preventing transverse movements of the handheld device 20. As used herein, the term "transverse" generally refers to a direction in the plane of the cradle and perpendicular to the direction of reciprocating movement of the handle of the docking assembly.

In FIGS. 1A and 1B, each of the four stoppers 266a to 266d is embodied by a protrusion projecting upward from a portion of a corresponding one of the four support elements 264a to 264d. As will be appreciated by one of ordinary skill in the art, the four stoppers 266a to 266d prevent transverse movements of the handheld device 20 without having to provide the first and second side portions 256 and 258 of the cradle 162 with a respective wall that would project upwardly from the bottom wall 174 of the cradle 162. Indeed, in embodiment illustrated in FIGS. 1A and 1B, the first and second side portions 256 and 258 of the cradle 162 are provided with corresponding recessed areas 268 and 270 formed in the bottom wall 174 of the cradle 162. It will also be apparent that these recessed areas 268 and 270 may ease the insertion and removal of the handheld device 20 in and from the cradle 162 by providing additional space for a user's hand or fingers to release or grasp the handheld device 20 in a close proximity of the bottom wall 174 of the cradle 162. However, in other embodiments, the first and second side portions 256 and 258 of the cradle 162 may be provided with a respective wall without departing from the scope of the invention.

It will be understood that docking the handheld device 20 to the docking assembly 172 generally implies that the handheld device 20 is to be inserted in the cradle 162 along one particular orientation. In some embodiments, the device interface 250 of the handheld device 20 does not protrude from the handheld device 20 and thus may not be readily identifiable or visible by a user, especially if the user suffers from low vision or other visual impairments. Hence, in certain circumstances, it may difficult for a user to determine the proper orientation of the handheld device 20 simply by viewing or grasping the outer surface thereof.

For example, as illustrated in the exemplary embodiment of FIGS. 1A and 1B, the cradle 162 may include an orientation key 276 for properly orienting the handheld device 20 inside the cradle 162 and facilitating the docking of the handheld device 20 to the docking assembly 172. More particularly, as described in further detail below, the orientation key 276 allows for properly orienting the handheld device 20 with respect to the first handle 178 of the docking assembly 172, by preventing the secure engagement of the handheld device 20 in the cradle 162 along an orientation where the device interface 250 would not face the handle interface 272.

In this embodiment, the orientation key 276 includes a protrusion extending upwardly from the cradle 162 and engageable in a complimentary recess (not shown) formed in the handheld device 20, the protrusion being eccentric with respect to a center of the cradle 162 such that the handheld device 20 may be received in the cradle 162 in only one orientation with respect thereto.

In some embodiments, the orientation key 276 may further include a presence detection switch 308 for detecting that the handheld device 20 is received in the cradle 162 and properly orientated with respect to the first handle 178, and thus ready to be docked to the docking assembly 172. The detection of the presence and the correct or incorrect positioning of the handheld device 20 in the cradle 162 by the presence detection switch 308 may be communicated to a user by any appropriate indicator including a visual indicator, an audio indicator, or a combination thereof. The presence detection switch 308 may be embodied by a micro switch or by any appropriate sensing device.

Handle

Referring to FIGS. 1A, 1B, 2A to 2C, the docking assembly 172 also includes a first handle 178 adjacent to the cradle 162 and reciprocally movable inwardly and outwardly relative to the cradle 162 between an open position (see FIG. 2C) and a closed position (see FIG. 2A) of the first handle 178. In FIG. 2B, the first handle 178 is in an intermediate position between the open and closed positions thereof. In the illustrated embodiment, the first handle 178 is disposed adjacent to the first side wall 260 of the cradle 162, but in other embodiments, one of ordinary skill in the art will understand that the first handle 178 may be positioned differently with respect to the cradle 162 without departing from the scope of the present invention.

Throughout the present description the term "handle" is understood to refer broadly to a component of the docking assembly that is displaceable reciprocally inwardly and outwardly relative to the cradle, and whose reciprocating inward and outward movement enables docking and undocking of a handheld device to the docking assembly. As mentioned above, in this context, the terms "inward and outward" refer respectively to a direction of movement of the first handle toward and away from a center of the cradle. Similarly, the terms "closed position" and "open position" are understood to refer to the maximum inward and outward positions of the first handle relative to the cradle, respectively, as illustrated in FIG. 2A, wherein the first handle 178 is in the open position thereof, and in FIG. 2C, wherein the first handle 178 is in the closed position thereof.

Furthermore, in some embodiments, the term "handle" may particularly denote a component size and shaped ergonomically for facilitating grasping, gripping, pushing, pulling or otherwise actuating by a hand or fingers of a user. For example, in the embodiment illustrated in FIGS. 1A and 1B, the first handle 178 exhibits a gradually and outwardly decreasing curvilinear height profile that defines a hand-receiving or finger-receiving portion for easing manual displacement of the first handle 178 between the open and closed positions thereof using a user's hand or fingers. In such an embodiment, it will be understood that the first handle 178 may preferably be made of a rigid, strong and smooth material providing a convenient, effective and comfortable user interaction, and capable of sustaining repeated use. However, one of ordinary skill in the art will understand that, in other embodiments, the first handle 178 need not be provided with an ergonomically or specifically designed hand-receiving or finger-receiving portion intended for use by a user's hand or fingers. For example, as discussed below, in some embodiments, the reciprocating movement of the first handle 178 may be motorized or otherwise automatically driven by a suitable actuator without the user having to manually displace the first handle.

Still referring to FIGS. 1A, 1B, 2A to 2C, the first handle 178 has a handle interface 272 that faces the device interface 250 when the handheld device 20 is placed in the cradle 162. The handle interface 272 includes a pair of spaced-apart first alignment projections 184a and 184b and a handle data connector 182 connectable to the device data connector 254, the first alignment projections 184a and 184b being engageable with the first alignment cavities 252a and 252b of the handheld device 20. In the illustrated embodiment, the handle data connector 272 is located between the two first alignment projections 184a and 184b. However, in other embodiments, the relative disposition of the handle data connector 272 and the pair of first alignment projections 184a and 184b may be different without departing from the scope of the invention.

It is to be noted that while the handle interface includes two first alignment projections in the embodiments described below, one of ordinary skill in the art will understand that in other embodiments, the handle interface may alternatively be provided with more than two first alignment projections without departing from the scope of the present invention. In such embodiments, it will be readily understood that the handheld device is preferably provided with a corresponding equal number of complimentary alignment cavities.

It should also be emphasized that, throughout the present description, the term "first" in reference to the handle or to the pair of alignment projections or other features thereof is used merely for clarity and to differentiate different elements in embodiments wherein the docking assembly includes more than one handle. Furthermore, it will be apparent to one of ordinary skill in the art that the use of the term "first handle" is not to be construed as implying that docking assemblies according to embodiments of the present invention necessarily include more than one handle. More particularly, embodiments of the docking assembly may include only a single handle without departing from the scope of the present invention. One of ordinary skill in the art will also understand that similar considerations apply to the term "first" as used above in reference to the pair of alignment cavities of handheld device.

As will be apparent to one of ordinary skill in the art, the handle data connector 182 is the component of the docking assembly 172 that connects with the device data connector 254 of the handheld device 20 and that allows the handheld device 20 to be docked to the docking assembly 172 and to exchange data therewith. Therefore, as mentioned above regarding the device data connector 254 of the handheld device 20, the handle data connector 182 preferably includes at least one I/O electrical contacts, ports, terminals or connectors adapted for establishing data connections with complementary or corresponding electrical contacts, ports, terminals or connectors provided with the device data connector 254. As will be readily understood by one of ordinary skill in the art, any appropriate type of data connection may be used. For example, the I/O ports of the handle data connector 182 may include, without being limited to, at least one of a high-definition multimedia interface (HDMI) port, a data transfer port, such as a universal serial bus (USB) port, an audio port, an inter-integrated circuit (I2C) port, a power interface port, and a digital visual interface (DVI) port, or, generally, any audio, video or communication port. By way of example, the I/O ports may be embodied by FireWire (trademark) or DisplayPort (trademark) ports.

As used herein, the terms "data connector" may generally and interchangeably refer to a male-type data connector, female-type data connector, or a combination thereof. In some embodiments, the handle data connector 182 is a male-type data connector provided with one or more pins or protruding electrical contacts adapted to engage a female-type device data connector 254 with one or more cavities or recessed electrical contacts. For example, in the embodiment illustrated in FIGS. 1A, 1B, 2A to 2C, the handle data connector 182 is a 40-pin male-type data connector and the device connector 254 is a complimentary 40-pin female type data connector. Alternatively, in other embodiments, the reverse situation may be envisioned, whereby the handle data connector 182 and the device connector 254 are a female-type and a male-type data connector, respectively.

With continuing reference to FIGS. 1A, 1B and 2A to 2C, the pair of spaced-apart first alignment projections 184a and 184b of the handle interface 272 provide alignment aids for facilitating docking of the handheld device 20 to the docking assembly 172. It will be understood that the first alignment projections 184a and 184b may be embodied by structures of various shapes and sizes such as pins, protrusions, protuberances, ribs, ridges, tabs, knobs, bulges, and the like, which are preferably complimentary to those of the alignment cavities 252a and 252b. One of ordinary skill in the art will understand that the first alignment projections 184a and 184b of the first handle 178 preferably protrude further from the handle interface 272 than the handle data connector 182, thereby ensuring that the first alignment projections 184a and 184b engage the first alignment cavities 252a and 252b of the handheld device 20 before the handle data connector 182 connects with the device data connector 254.

In some embodiments, such as the embodiment illustrated in FIGS. 1A, 1B and 2A to 2C, the docking assembly 172 may further include a second handle 180 adjacent to the cradle 162 and opposing the first handle 178, the second handle 180 being reciprocally movable inwardly and outwardly relative to the cradle 162 between an open position and a closed position of the second handle 180. It will be understood that in these embodiments, the second handle 180 moves in a direction opposite to that of the first handle 178, so that the first and second handles 178 and 180 are brought closer together as each handle moves inwardly toward the closed position thereof, and spread farther apart as each handle moves outwardly toward the open position thereof.

In the illustrated embodiment, the second handle 180 assumes a shape similar to that of the first handle 178, and is therefore also provided with a gradually and outwardly decreasing curvilinear height profile that defines a hand-receiving or finger-receiving portion for easing manual displacement of the second handle 180 between the open and closed positions thereof using a user's hand or fingers. However, it will be readily understood by one of ordinary skill in the art that the second handle 180 may, but need not, be sized and shaped similarly to the first handle 178. Likewise, as discussed above in regard to the shape of the first handle 178, the second handle 180 may, but need not, be sized and shaped ergonomically for facilitating actuating by a hand or fingers of a user.

In some embodiments, the second handle 180 may preferably include a pair of second alignment projections 186a and 186b sized and shaped to engage with a complimentary pair of second alignment cavities 274a and 274b provided on the handheld device 20 on a side opposite to the device interface 250. It will be appreciated that providing second alignment projections 186a and 186b on the second handle 180 helps securing and steadying the handheld device 20 received in the cradle 162, as well as docking the handheld device 20 to the docking assembly 172 by providing an additional alignment that facilitates the connection between the handle data connector 182 and the device data connector 254.

It will be apparent to one of ordinary skill in the art that the second alignment projections 186a and 186b of the second handle 180 may, but need not, be of similar shape and size as the first alignment projections 184a and 184b of the first handle 178. Moreover, while two second alignment projections 186a and 186b are illustrated in the embodiment of FIGS. 1A, 1B and 2A to 2C, one of ordinary skill in the art will understand that in other embodiments, the second handle 180 may be provided with a single or more than two second alignment projections without departing from the scope of the present invention. In such embodiments, it will be readily understood that the handheld device is preferably provided with a corresponding equal number of complimentary alignment cavities.

Displacement Mechanism

Figure 3A:
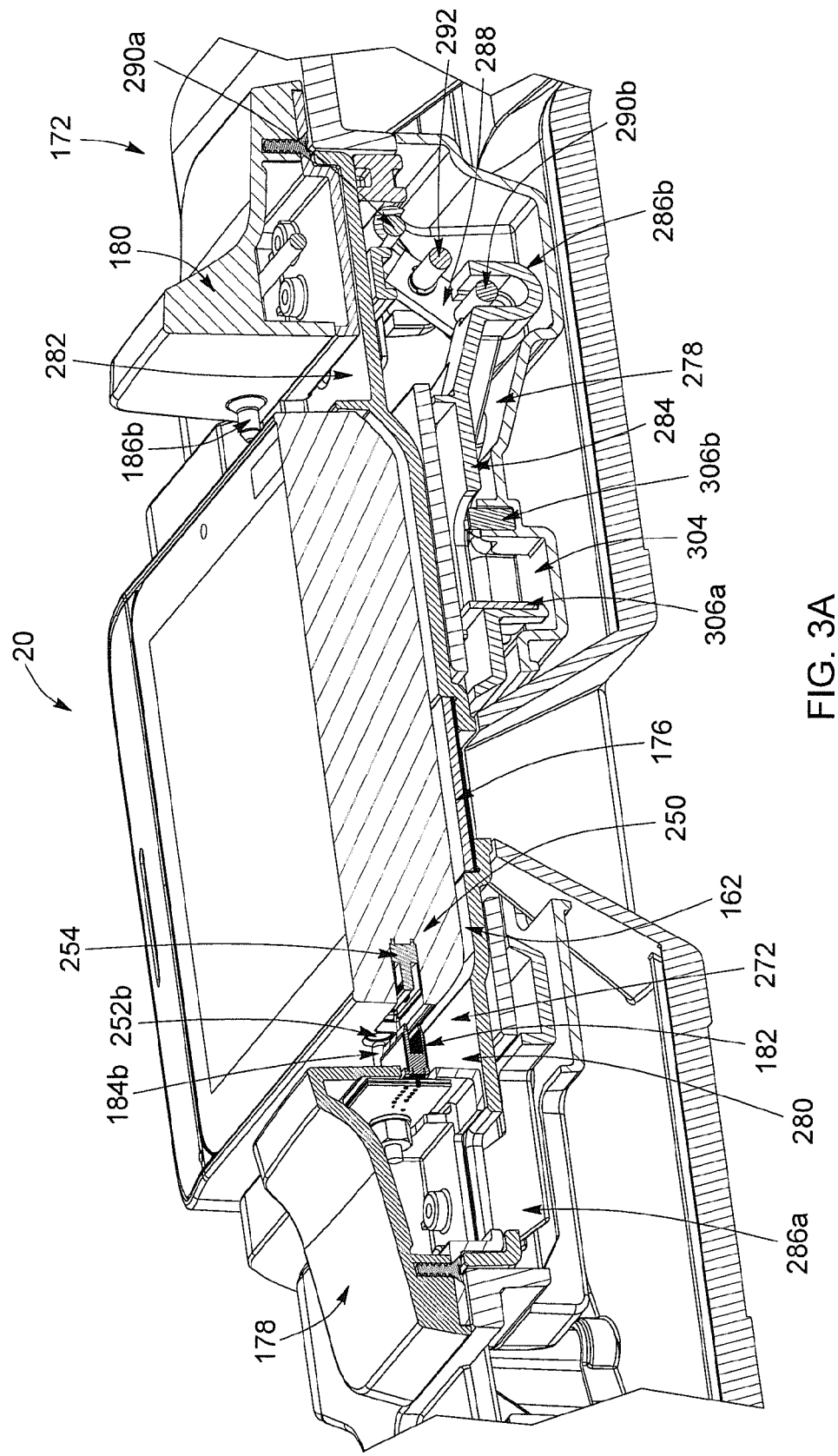
FIGS. 3A to 3C are cross-sectional perspective views of FIGS. 2A to 2C taken along section lines 3A to 3C, respectively, in order to illustrate the displacement mechanism of the docking assembly, in accordance with an embodiment of the invention.
Figure 3B:
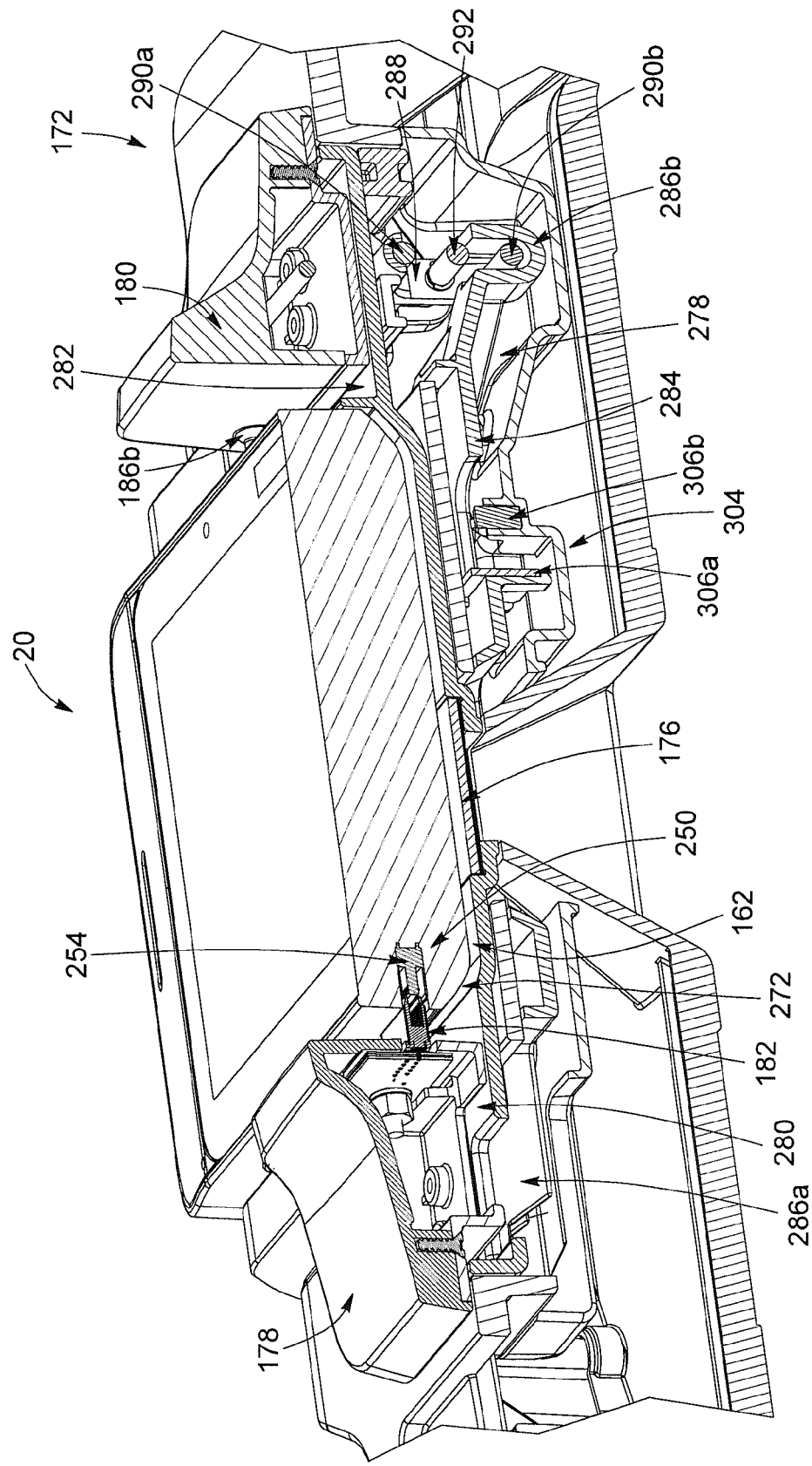
Figure 3C:
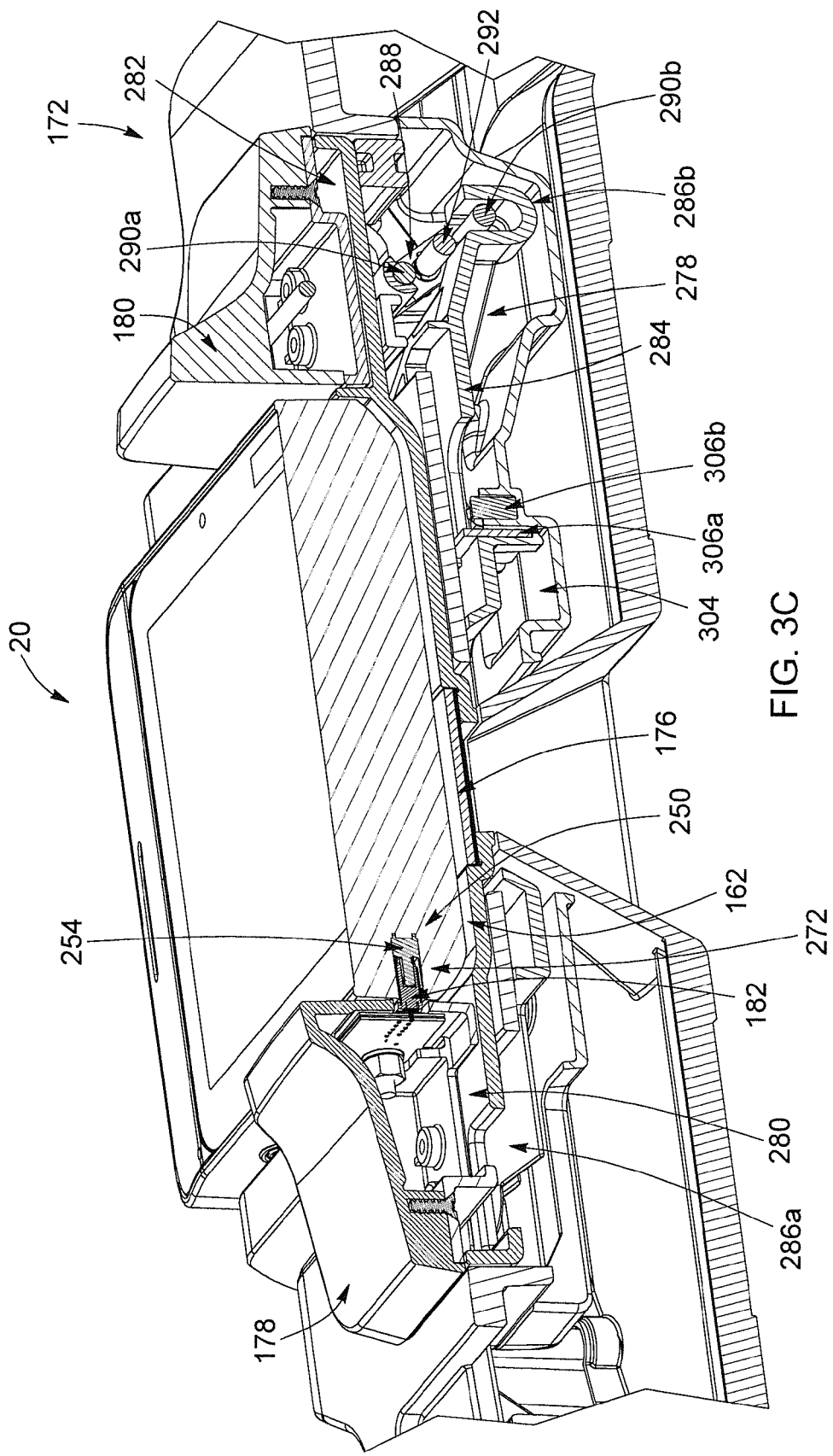

The docking assembly 172 further includes a displacement mechanism 278 operatively connected to the first handle 178, as illustrated in FIGS. 3A to 3C, which are cross-sectional perspective views of FIGS. 2A to 2C taken along section lines 3A to 3C, respectively. The displacement mechanism 278 is configured for allowing the first handle 178 to reciprocally move between the open and closed positions thereof 24. As the first handle 178 is moved inwardly from the open position to the closed position thereof, the first alignment projections 184a and 184b progressively engage the first alignment cavities 252a and 252b (see also FIGS. 2A to 2C) in order to guide the handle data connector 182 (see FIG. 1B) toward the device data connector 254 (see FIG. 1A) until a connection therebetween is established.

As used herein, the term "displacement mechanism" refers broadly to the collection or combination of elements, components, means, devices and/or modules that are operatively connected to the one or more handles of the docking assembly and that permit and control the reciprocating inward and outward movement of the one or more handles between an open position, wherein the handheld device received in the cradle is undocked from the docking assembly, and a closed position, wherein the handheld device received in the cradle is docked to the docking assembly.

In the exemplary embodiment of FIGS. 3A to 3C, due to the provision of the second handle 180, the displacement mechanism 278 operatively connects the first and second handles 178 and 180, so that the first and second handles 178 and 180 are together reciprocally movable inwardly and outwardly relative to the cradle 162 between an open position (FIG. 3A) and a closed position (FIG. 3C) of the first and second handles. In FIG. 3B, the first and second handles 178 and 180 are in an intermediate position between the open and closed positions thereof. Hence, as the first and second handles 178 and 180 are moved inwardly, the first alignment projections 184a and 184b progressively engage the first alignment cavities 252a and 252b (see also FIGS. 2A to 2C) in order to guide the handle data connector 182 (see FIG. 1B) toward the device data connector 254 (see FIG. 1A) until a connection therebetween is established. At the same time, the second alignment projections 186a and 186b progressively engage the second alignment cavities 274a and 274b, thus further facilitating docking of the handheld device 20 to the docking assembly 172.

In the illustrated embodiment, the displacement mechanism 278 is preferably a sliding mechanism that includes sliding channels 280 and 282 formed on a top surface of the docking assembly for slidably receiving the first and second handles 178 and 180 therein, respectively, in a manner that enables reciprocating inward and outward sliding movements of the first and second handles 178 and 180 between the respective open and closed positions thereof. However, it will be understood by one of ordinary skill in the art that, in other embodiments, other types of displacement mechanism such as a roller mechanism may be used without departing from the scope of the present invention.

Furthermore, actuation of the first and second handles 178 and 180 is preferably performed manually by a user using one hand or two hands. For example, the first and second handles 178 and 180 may be moved inwardly and outwardly by using only one hand, wherein the thumb is used to push inwardly or pull outwardly one handle, while at least one of the opposing fingers is used to push inwardly or pull outwardly the other handle. However, as mentioned above, the movement of the first and second handles 178 and 180 may alternatively be motorized or automatically driven by a motor or a suitable actuator without the user having to manually displace the first and second handles 178 and 180. In such embodiments, the first and second handles 178 and 180 may be set in motion by pressing on a button or a switch provided on the docking assembly 172 and operatively connected to the displacement mechanism 278.

Still referring to FIGS. 3A and 3C, the displacement mechanism 278 preferably includes an elongated member 284 having first and second ends 286a and 286b, the first end 286a of the elongated member 284 being connected to one of the first and second handles 178 and 180 (i.e. to the first handle 178 in FIGS. 3A to 3C). In the illustrated embodiment, the elongated member 284 is preferably disposed inside the docking assembly 172 and more specifically under the bottom wall 174 of the cradle 162. The displacement mechanism 278 may also include a pivoting member 288 having first and second ends 290a, 290b, and a pivot point 292. The first end 290a of the pivoting member 288 may be connected to the other one of the first and second handles 178 and 180 (i.e. to the second handle 180 in FIGS. 3A to 3C), and the second end 290b of the pivoting member 288 may be connected to the second end 286b of the elongated member 284. In this exemplary configuration of the displacement mechanism 278, inward and outward displacements of one of the first and second handles 178 and 180 drive, via the elongated and pivoting members 284 and 288 of the displacement mechanism 278, corresponding and opposite inward and outward displacements of the other one of the first and second handles 178 and 180.

Figure 4:
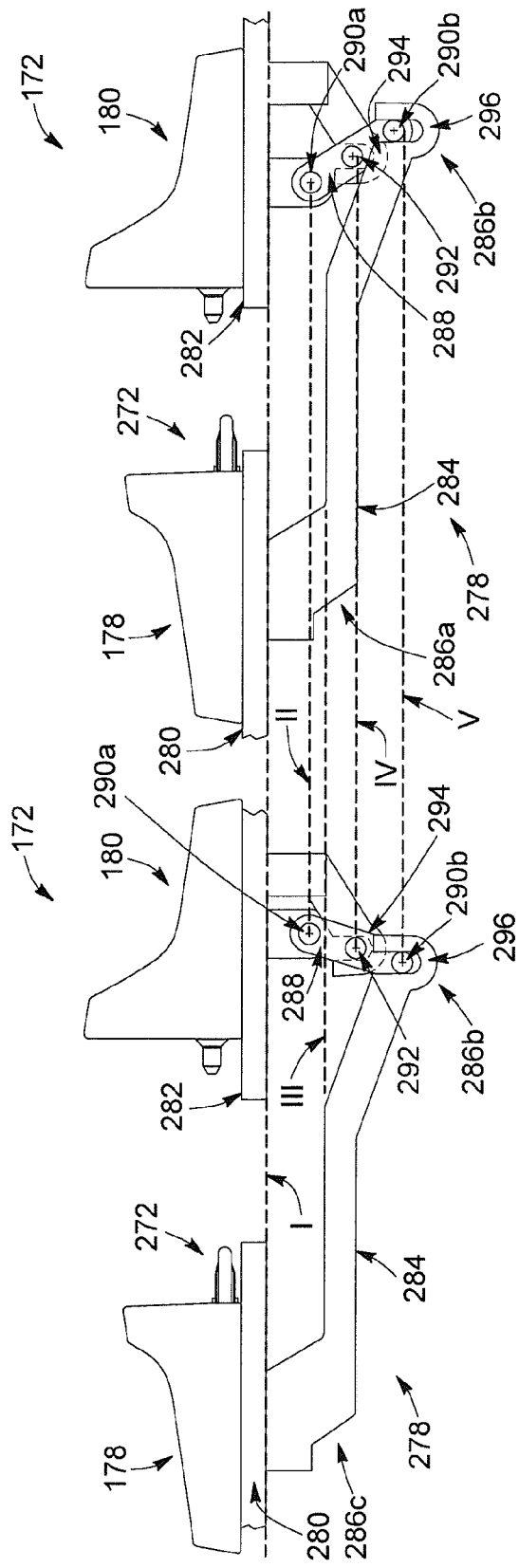
FIG. 4 is a schematic representation illustrating the movement of the pivoting member of the displacement mechanism of the docking assembly, in accordance with an embodiment of the invention.

Referring to FIG. 4, there is shown a schematic representation illustrating further the movement of the pivoting member 288 of the displacement mechanism 278 of the docking assembly 172, in accordance with an embodiment of the invention. More particularly, the pivoting member 288 is depicted at two angular positions thereof between the open and closed positions of the first and second handles 178 and 180, as viewed on the left and right sides of FIG. 4. In the illustrated embodiment, the pivoting member 288 preferably pivots inside a substantially U-shaped holder 294, which is fixed and stationary relative to the docking assembly 172. Similarly, the second end 286b of the elongated member 284 also preferably includes a U-shaped holder 296 that receives therein the second end 290b of the pivoting member 288. In this configuration, it will be understood that, as the pivoting member pivots about the pivot point 292 thereof, the first end 290a of the pivoting member will remain at a constant vertical position, as illustrated by the horizontal lines II shown in FIG. 4. On the contrary, as also depicted in FIG. 4, the pivot point 292 and the second end 292a of the pivoting member 288 will move vertically by sliding along the U-shaped holders 294 and 296, respectively. The vertical displacement of the pivot point 292 and of the second end 292a of the pivoting member 288, emphasized by the horizontal lines IV and V, ensures that the collective movement of the first and second handles 178 and of the elongated member 284 remains substantially horizontal irrespective of the pivotal motion of the pivoting member 288, as seen by looking at horizontal lines I and III.

Biasing Element

Figure 5A:
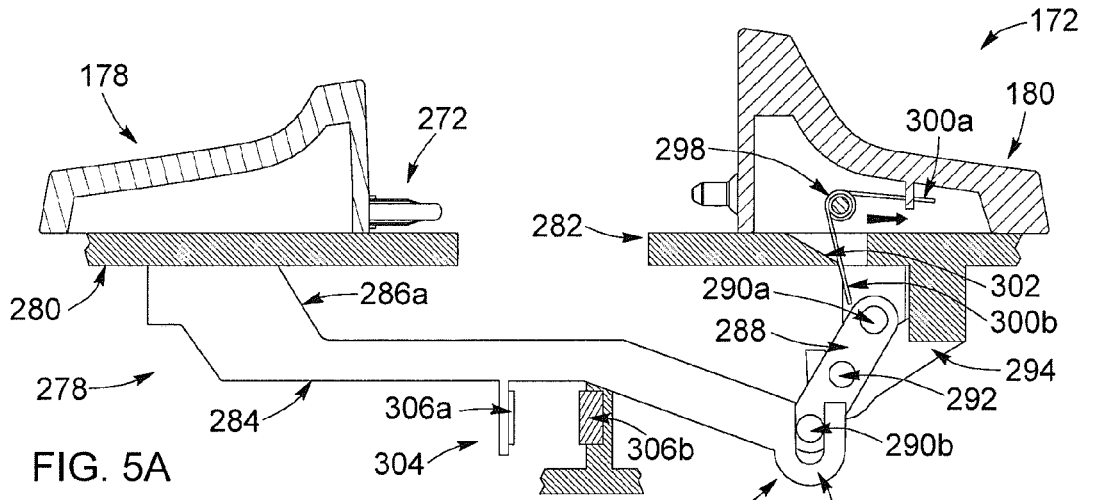
FIGS. 5A to 5C are schematic representations of the biasing and securing elements of the docking assembly, in accordance with an embodiment of the invention.
Figure 5B:
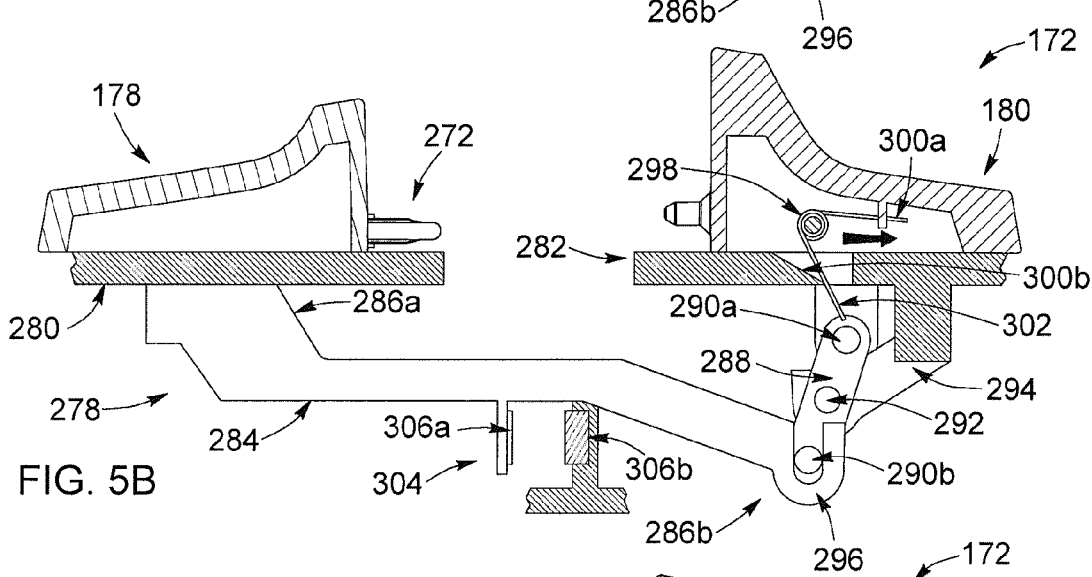
Figure 5C:
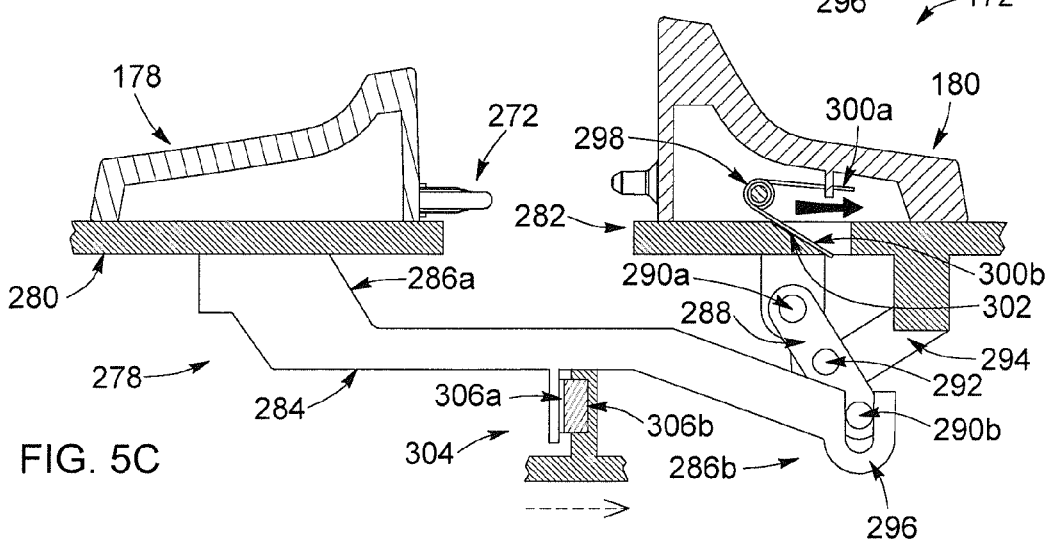

Referring now to FIGS. 5A to 5C, the docking assembly 172 may further comprise a biasing element 298 for biasing each of the first and second handles 178 and 180 in the open position thereof by applying thereto an outwardly directed restoring force. The biasing element 298 is preferably embodied by a spring such as a compression, a tension or a torsion spring or a combination thereof, or by another suitable elastic element capable of storing mechanical energy. In other embodiments, the biasing element 298 may alternatively or additionally include magnetically-attractive elements such as magnets, electromagnets, a magnetically-susceptible material that is attracted to another magnet, or a combination thereof.

In the illustrated embodiment, the biasing element 298 is located inside the second handle 180 and is embodied by a torsion spring having a first end 300a abutting against the second handle 180 and a second end 300b abutting against a stationary abutment point 302 inside the docking assembly 172. In this embodiment, it will be understood that the outwardly directed restoring force imposed directly on the second handle 180, which is represented by solid arrows in FIGS. 5A to 5C, is also communicated to the first handle 178 via the elongated member 284 and the pivoting member 288 of the displacement mechanism 278. However, it will be understood that, in other embodiments, the biasing element 298 may be located inside the first handle 178 or elsewhere in the docking assembly 172 without departing from the scope of the present invention. FIGS. 5A to 5C also illustrate that the magnitude of the outwardly directed restoring force applied by the biasing element 298 on the first and second handles 178 and 180 increases as the first and second handles 178 and 180 are displaced inwardly and brought closer together, as depicted by the increasingly thick solid arrows between FIGS. 5A and 5C.

Securing Element

Still referring to FIGS. 5A to 5C, the docking assembly may also include a securing element 304 for maintaining the first and second handles 178 and 180 in the closed position thereof. More particularly, the securing element 304 may ensure that once the first and second handles 178 and 180 reach the closed position thereof, for example when the handled device 20 is docked to the docking assembly 172 such as in FIGS. 2C and 3C, the first and second handles 178 and 180 remain in the closed position. The securing element 304 is thus preferably configured to apply an inwardly directed force to the first and second handles 178 and 180, represented by a dashed arrow in FIG. 5C, which is sufficient to counteract the outwardly directed restoring force produced by the biasing element 298.

In the embodiment of FIGS. 5A to 5C, the securing element 304 includes a first and a second magnetically-attractive component 306a and 306b, at least one of the first and second magnetically-attractive components 306a and 306b being a permanent magnet. However, in other embodiments, other appropriate types of securing element 304, for example mechanical fasteners such as a hook-and-loop fastener or a spring-loaded plunger, may be envisioned without departing from the scope of the present invention.

As used herein, the term "magnetically-attractive component" refers to a magnetic component or material that is either a permanent magnet or a magnetically-susceptible material that is attracted to another magnet but cannot generate its own magnetic field. Likewise, the term "permanent magnet" is meant to refer to a material that may be magnetized so as to retain a strong remanent magnetization and produce a persistent magnetic field. The term "permanent magnet" is used broadly, however, and may include electromagnets. Furthermore, the term "permanent" should not be construed to require that a permanent magnet may not lose its remanent magnetization, for example, exposure to heat, physical shock, or a demagnetizing magnetic field. Hence, in some embodiments, the first and second magnetically-attractive components 306a and 306b may include a permanent magnet and a magnetically-susceptible material (e.g. a material including iron, nickel, cobalt and alloys thereof) or, alternatively, two permanent magnets with their respective poles oriented such that to cause magnetic attraction therebetween.

Still referring to FIGS. 5A to 5C, the first magnetically-attractive component 306a preferably moves inwardly and outwardly along with the first handle 178, as well as along the second handle 180 when a second handle 180 is provided. In contrast, the second magnetically-attractive component 306b is stationary and disposed inside the docking assembly 172 so that the first and second magnetically-attractive components 306a and 306b become magnetically coupled to each other when the first and second handles 178 and 180 reaches the closed position thereof. It will be understood that in other embodiments, one of the magnetically-attractive component may be disposed within the handheld device without departing from the scope of the invention.

In particular, in FIG. 5C, the first and second handles 178 and 180 are in the closed position thereof. In this position, an inwardly directed magnetic force resulting from the magnetic coupling established between the first and second magnetically-attractive components 306a and 306b counterbalances the outwardly directed restoring force generated by the biasing element 298, thus preventing the first and second handles 178 and 180 from returning to the open position thereof. In contrast, in FIGS. 5A and 5B, the first and second magnetically-attractive components 306a and 306b are not magnetically coupled to each other and no inwardly directed magnetic force is generated for compensating the outwardly directed restoring force generated by the biasing element 298 and therefore preventing the first and second handles 178 and 180 from returning to the open position thereof.

Of course, numerous modifications could be made to the embodiments described above without departing from the scope of the present invention.

The invention claimed is:

1. A docking assembly for removably docking a handheld device thereto, the handheld device having a device interface comprising a pair of spaced-apart first alignment cavities and a device data connector, the docking assembly comprising:
   a cradle adapted to receive the handheld device therein;
   a first handle adjacent to the cradle and reciprocally movable inwardly and outwardly relative to the cradle between an open position and a closed position of the first handle, the first handle having a handle interface that faces the device interface when the handheld device is placed in the cradle, the handle interface comprising a pair of spaced-apart first alignment projections and a handle data connector connectable to the device data connector, the first alignment projections being engageable with the first alignment cavities of the handheld device; and
   a displacement mechanism operatively connected to the first handle and configured for allowing the first handle to reciprocally move between the open and closed positions thereof such that, as the first handle is moved inwardly from the open position to the closed position thereof, the first alignment projections progressively engage the first alignment cavities in order to guide the handle data connector toward the device data connector until a connection therebetween is established.

2. The docking assembly according to claim 1, wherein the cradle has a shape that substantially matches a shape of the handheld device for receiving the handheld device snugly in the cradle.

3. The docking assembly according to claim 1, wherein the cradle comprises a bottom wall shaped and configured to receive and support the handheld device, the bottom wall comprising a transparent window for allowing the handheld device to acquire images therethrough.

4. The docking assembly according to claim 1, wherein the cradle comprises a bottom wall, a first side wall adjacent to the first handle, and a second side wall opposite to the first side wall, the first and second side walls being shaped and configured so that the handheld device is received snugly in the cradle, the first and second side walls being further configured for maintaining the handheld device in place therebetween so as to prevent inward and outward movements of the handheld device.

5. The docking assembly according to claim 1, wherein the cradle comprises an orientation key for properly orienting the handheld device with respect to the first handle, so that the device interface faces the handle interlace when the handheld device is received in the cradle.

6. The docking assembly according to claim 1, wherein the first alignment projections of the first handle protrude further from the handle interface than the handle data connector, thereby ensuring that the first alignment projections engage the first alignment cavities of the handheld device before the handle data connector connects with the device data connector.

7. The docking assembly according to claim 1, wherein the docking assembly further comprises a biasing element biasing the first handle in the open position thereof by applying thereto an outwardly directed restoring force.

8. The docking assembly according to claim 1, wherein the displacement mechanism comprises a sliding channel formed on a top surface of the docking assembly for slidably receiving the first handle therein in a manner that enables reciprocating inward and outward sliding movements of the first handle between the open and closed positions thereof.

9. The docking assembly according to claim 1, further comprising a second handle adjacent to the cradle and opposing the first handle, the second handle being reciprocally movable inwardly and outwardly relative to the cradle between an open position and a closed open position of the second handle.

10. The docking assembly according to claim 4, wherein the cradle further comprises support elements for receiving the handheld device thereonto, each support element projecting upwardly from the bottom wall near a corner thereof.

11. The docking assembly according to claim 10, wherein each of the support elements comprises a stopper for preventing transverse movements of the handheld device.

12. The docking assembly according to claim 5, wherein the orientation key comprises a protrusion extending upwardly from the cradle and engageable in a complimentary recess formed in the handheld device, the protrusion being eccentric with respect to a center of the cradle such that the handheld device can be received in the cradle in only one orientation with respect thereto.

13. The docking assembly according to claim 5, wherein the orientation key comprises a presence detection switch for detecting that the handheld device is received in the cradle and properly oriented with respect to the first handle.

14. The docking assembly according to claim 1, wherein the handle data connector comprises at least one input/output port.

15. The docking assembly according to claim 14, wherein the at least one input/output port comprises at least one of a data transfer port, a video port, an audio port, a power interface port, and a combination thereof.

16. The docking assembly according to claim 7, wherein the docking assembly further comprises a securing element for maintaining the first handle in the closed position thereof, the securing element being configured to apply an inwardly directed force to the first handle sufficient to counteract the outwardly directed restoring force produced by the biasing element.

17. The docking assembly according to claim 16, wherein the securing element comprises a first and a second magnetically-attractive component, at least one of the first and second magnetically-attractive components being a permanent magnet, the first magnetically attractive component moving inwardly and outwardly along with the first handle, and the second magnetically-attractive component being stationary and disposed so that the first and second magnetically-attractive components become magnetically coupled to each other when the first handle reaches the closed position thereof.

18. The docking assembly according to claim 9, wherein the second handle comprises a pair of second alignment projections sized and shaped to engage with a complimentary pair of second alignment cavities provided on the handheld device on a side opposite to the device interface.

19. The docking assembly according to claim 9, wherein the docking assembly comprises a biasing element biasing each of the first and second handles in the open position by applying thereto an outwardly directed restoring force.

20. The docking assembly according to claim 9, wherein the displacement mechanism operatively connects the first and second handles, so that the first and second handles are together reciprocally movable inwardly and outwardly relative to the cradle between an open position and a closed position of the first and second handles.

21. The docking assembly according to claim 19, wherein the docking assembly further comprises a securing element for maintaining the first and the second handles in the closed position, the securing element being configured to apply an inwardly directed force to the first and second handles sufficient to counteract the outwardly directed restoring force produced by the biasing element.

22. The docking assembly according to claim 20, wherein the displacement mechanism comprises:

an elongated member having first and second ends, the first end of the elongated member being connected to one of the first and second handles; and a pivoting member having first and second ends, and a pivot point, the first end of the pivoting member being connected to the other one of the first and second handles, and the second end of the pivoting member being connected to the second end of the elongated member.

23. The docking assembly according to claim 21, wherein the securing element comprises a first and a second magnetically-attractive component, at least one of the first and second magneticaliy-attractive components being a permanent magnet, the first magnetically-attractive component moving inwardly and outwardly along with the first and second handles, and the second magnetically attractive component being stationary and disposed so that the first and second magnetically-attractive components become magnetically coupled to each other when the first and second handles are in the closed position.

* * * * *